US012078945B2

(12) United States Patent
Yamana

(10) Patent No.: US 12,078,945 B2
(45) Date of Patent: Sep. 3, 2024

(54) TEMPERATURE MEASURING DEVICE OF FUSING DEVICE AND IMAGE FORMING APPARATUS

(71) Applicant: SHARP KABUSHIKI KAISHA, Sakai (JP)

(72) Inventor: Shinji Yamana, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 52 days.

(21) Appl. No.: 17/890,187

(22) Filed: Aug. 17, 2022

(65) Prior Publication Data

US 2023/0077657 A1 Mar. 16, 2023

(30) Foreign Application Priority Data

Aug. 27, 2021 (JP) ................................ 2021-139125

(51) Int. Cl.
*G03G 15/20* (2006.01)
*G03G 15/00* (2006.01)
*G03G 21/20* (2006.01)

(52) U.S. Cl.
CPC ..... *G03G 15/2039* (2013.01); *G03G 15/2064* (2013.01); *G03G 15/5045* (2013.01); *G03G 21/206* (2013.01); *G03G 2215/2032* (2013.01)

(58) Field of Classification Search
CPC ................ G03G 15/2039–205; G03G 21/206
See application file for complete search history.

(56) References Cited

U.S. PATENT DOCUMENTS

2003/0227533 A1* 12/2003 Yokoi ................ G03G 15/2053 347/156
2005/0053390 A1* 3/2005 Suzuki ............... G03G 15/2014 399/69
2007/0177895 A1* 8/2007 Yano ...................... G03G 21/20 399/122
2016/0334740 A1* 11/2016 Tokunaga ............... G01J 5/048

FOREIGN PATENT DOCUMENTS

JP 2003-035601 A 2/2003
JP 2015170396 A * 9/2015
JP 2019164281 A * 9/2019
JP 2020-013018 A 1/2020

* cited by examiner

*Primary Examiner* — Sevan A Aydin
(74) *Attorney, Agent, or Firm* — ScienBiziP, P.C.

(57) ABSTRACT

A thermopile sensor that is a temperature measuring device of a fusing device is held on a substrate. The substrate is provided with a cylindrical member extending in front of the thermopile sensor and an aperture disposed at an end of the cylindrical member.

7 Claims, 11 Drawing Sheets

TEMPERATURE MEASURING DEVICE OF FUSING DEVICE AND IMAGE FORMING APPARATUS

BACKGROUND OF THE INVENTION

Field of the Invention

The present disclosure relates to a temperature measuring device of a fusing device and an image forming apparatus, and, particularly to a temperature measuring device of a fusing device and an image forming apparatus, including, for example, a fusing rotary body and a pressure rotary body for thermally fusing a toner image formed on a recording medium.

Description of the Background Art

For fusing temperature control, thermopile sensors having excellent responsiveness are known as temperature sensors. Thermopile sensors have an upper temperature limit of 100° C. or less, so they cannot be disposed inside the fusing device. However, the light-receiving angle of a thermopile sensor is narrow, allowing measurement away from the object. An example of such a temperature measuring device for a fusing device is disclosed in the conventional technique. A temperature measuring device of a fusing device according to the conventional technique is a temperature sensing device that performs non-contact detection of the surface temperature of a heated object heated by a heating source, and includes a non-contact type temperature sensor (thermopile sensor) that is disposed opposite the heated object and measures infrared rays emitted from the heated object, a sensor unit including a case housing the non-contact type temperature sensor, and an outer shell case that houses the sensor unit and maintains a uniform temperature around the sensor unit.

Similarly, an example in which a thermopile sensor is used as a temperature measuring device of a fusing device is disclosed in the conventional technique. In the temperature measuring device of the fusing device according to the conventional technique, a duct member is disposed to allow air to flow from the thermopile sensor to the fusing belt so as to prevent a difference between the actual temperature of the fusing belt and the detection temperature of the thermopile sensor caused by water vapor filled inside a fusing cover from flowing into the thermopile sensor and condensing on the lens of the thermopile sensor. A guiding member is disposed to guide the air flowing from the fusing belt, to prevent the airflow from the thermopile sensor from directly hitting the fusing belt and causing a localized drop in the surface temperature of the fusing belt. The two opposing airflows collide at a position where the thermopile sensor and the fusing belt face each other and are allowed to escape in a direction intersecting the opposing direction, to prevent the thermopile sensor and the fusing belt from being affected by each other's airflow.

In the conventional technique, there is a problem in that the apparatus becomes larger due to the outer shell case, and that the amount of infrared light received by the thermopile changes due to the temperature change of the outer shell case and causes erroneous detection of the temperature. This is because infrared rays at an angle wider than the light-receiving angle of the thermopile unintentionally reach the thermopile light-receiving surface due to internal reflection of the focusing lens barrel of the thermopile. Hereinafter, infrared light received at an angle wider than the light-receiving angle of the thermopile is referred to as stray light. Radiant heat from a source other than the measurement target, such as the outer shell case, can be stray light to the thermopile, so the radiation received by the thermopile from a source other than the measurement target is referred to as stray light radiation.

In the conventional technique, the airflows from the thermopile sensor and the fusing belt, which oppose each other, is allowed to escape in the direction intersecting the opposing direction. However, in some cases, the airflows may not escape properly, or the airflows may affect the temperature measurement and cause false detection.

Therefore, an object of the disclosure is to provide a temperature measuring device that can prevent false detection by a thermopile sensor.

SUMMARY OF THE INVENTION

The temperature measuring device for the fusing device, according to the disclosure, measures the temperature of a temperature detection target in the fusing device through an opening portion in the fusing device by a thermopile sensor installed outside the fusing device. The thermopile sensor is held by a sensor holding member. The sensor holding member is provided with a cylindrical member extending in front of the thermopile sensor and an aperture disposed at an end of the cylindrical member.

By preventing the radiant heat from the outside by the cylindrical member and receiving the stray light radiation from the inner wall of the cylindrical member close to the sensor temperature, the influence on the detected temperature is suppressed, and more stray light can be blocked without disturbing the original light receiving range by the aperture at the end.

As a result, a temperature measuring device that can prevent false detection by a thermopile sensor can be provided.

Preferably, the cylindrical member is in contact with the thermopile sensor, and the thermopile sensor and the cylindrical member are thermally conductive.

The difference between the temperature of the cylindrical member and the temperature of the thermopile sensor can be reduced to suppress stray light radiation.

More preferably, the opening diameter of the aperture at the end of the cylindrical member does not interfere with the original light receiving range of the thermopile sensor.

It is preferable to provide the inner wall of the cylindrical member with a metal cylinder having low emissivity. As a result, emissivity can be suppressed, and stray light radiation can be reduced.

A metal cap having low emissivity may be placed over the tip of the holding portion.

In this way, the temperature rise of the holding portion caused by radiation from the fusing device can be suppressed, and the temperature difference between the holding portion and the thermopile sensor can be reduced.

According to one aspect of the disclosure, a ventilation port is provided in the cylindrical member.

Such a configuration can suppress the temperature rise of the holding portion.

According to another aspect of the disclosure, a gap is provided between an opening portion disposed in the fusing device and the aperture, and the temperature measuring device further comprises an exhaust fan that discharges airflow to outside to generate airflow that does not enter the cylindrical member from the opening portion disposed in the fusing device.

According to another aspect of the disclosure, an image forming apparatus includes any temperature measuring device of a fusing device described above.

The disclosure provides a temperature measuring device of a fusing device that prevents erroneous detection by a thermopile sensor because, by receiving stray light radiation from a cylindrical inner wall near the sensor temperature, the influence on the detection temperature is suppressed, more stray light can be blocked without interfering with the original light receiving range by an aperture at the end, and erroneous detection by a thermopile sensor can be prevented.

The above-described objects, other objects, features, and advantages of the disclosure will become more apparent from the detailed description of the following embodiment given with reference to the drawings.

BRIEF DESCRIPTION OF THE DRAWINGS

FIG. 9 is a cross-sectional view of the area near the thermopile sensor when the image forming apparatus is viewed from above.

DESCRIPTION OF THE PREFERRED EMBODIMENTS

Figure 1:
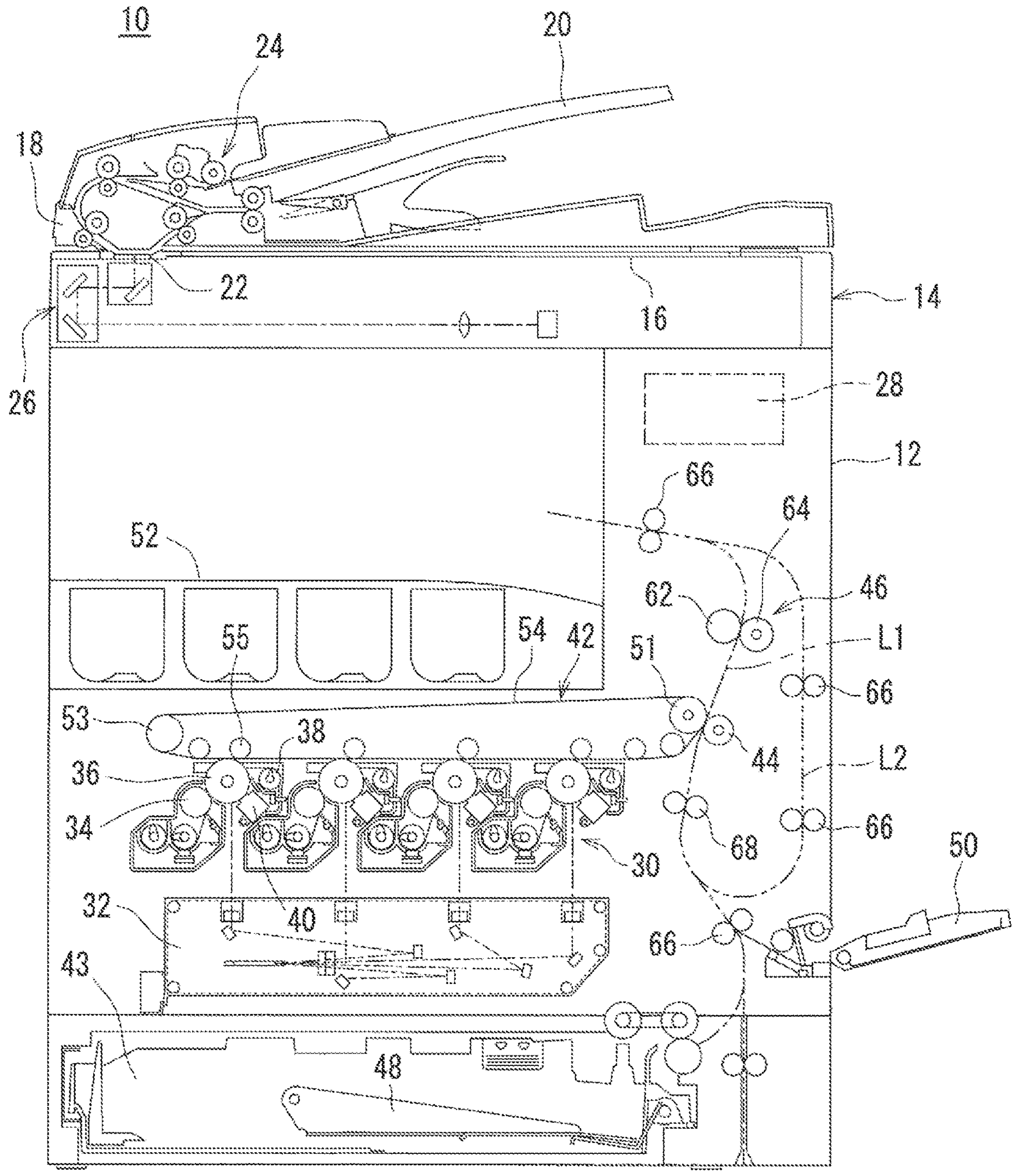
FIG. 1 is a schematic cross-sectional diagram illustrating the internal structure of an image forming apparatus according to a first embodiment of the disclosure.

Referring to FIG. 1, an image forming apparatus 10 according to an embodiment of the disclosure is an apparatus that forms a multicolor or monochromatic image on a sheet by an electrophotographic method. As described in detail below, the image forming apparatus 10 includes a fusing device 46 that thermally fuses the toner image formed on the sheet (recording medium).

A brief description will first be made on a basic configuration of the image forming apparatus 10. Note that in this specification, the front-back direction (depth direction) of the image forming apparatus 10 and its components are defined such that the surface facing the user's standing position, that is, the surface on the side to which the operation unit (not illustrated) is disposed is the forward surface (front surface). The left-right direction (transverse directions) of the image forming apparatus 10 and its components are defined with reference to the state in which the image forming apparatus 10 is viewed from a user.

As illustrated in FIG. 1, the image forming apparatus 10 according to the present embodiment is a multifunction peripheral (MFP) having functions such as a copier function, a printer function, a scanner function, and a facsimile function. The image forming apparatus 10 includes an apparatus body 12 including an image former 30, etc., and an image reading device 14 disposed above the apparatus body 12.

The image reading device 14 includes a document table 16 that is made of a transparent material. A document pressing cover 18 is attached in a freely openable/closable manner on the upper portion of the document table 16 via a hinge or the like. The document pressing cover 18 is provided with an automatic document feeder (ADF) 24 that automatically feeds, one sheet at a time, documents placed on a document loading tray 20 to an image reading position 22. On the front side of the document table 16, the operation unit (not illustrated) is provided to accept the user's input operation, such as a print instruction. The operation unit is appropriately provided with a display such as a touch screen, various operation buttons, etc.

An image reader 26 that includes a light source, multiple mirrors, an imaging lens, a line sensor, and the like is installed in the image reading device 14. The image reader 26 exposes a document surface to the light source, and leads reflected light, which is reflected from the document surface, to the imaging lens by using the mirrors. The reflected light is then imaged on a light receiving element of the line sensor by the imaging lens. The line sensor detects the luminance and chromaticity of the reflected light that is imaged on the light receiving element. In this way, image data that is based on an image on the document surface is generated. The line sensor may be a charge coupled device (CCD), a contact image sensor (CIS), or the like.

The apparatus body 12 incorporates a controller 28 including a CPU, a RAM, and an HDD, and the image former 30, etc. The controller 28 (the CPU in particular) transmits control signals to each part of the image forming apparatus 10 including the fusing device 46 in response to input operation by the user to the operation unit, and causes the image forming apparatus 10 to perform various operations.

The image former 30 includes an exposure unit 32, a developing device 34, a photoreceptor drum 36, a cleaner unit 38, a charger 40, an intermediate transfer belt unit 42, a secondary transfer roller 44, and the fusing device 46. The image former 30 forms an image on the sheet that is conveyed from a sheet feed tray 43 or a manual sheet feed tray 50, and outputs the image-formed sheet into an output tray 52. As the image data used to form the image on the sheet, image data read by the image reader 26, image data sent from an external computer, or the like is used.

The image data handled by the image forming apparatus 10 correspond to a color image in four colors including black (K), cyan (C), magenta (M), and yellow (Y). Accordingly, four each of the developing devices 34, the photoreceptor drums 36, the cleaner units 38, and the chargers 40 are provided to form four types of latent images corresponding to the four colors, and these constitute four image stations.

The photoreceptor drum 36 is an image carrier in which a photosensitive layer is formed on a surface of a conductive cylindrical base body, and the charger 40 is a member that charges a surface of this photoreceptor drum 36 to a predetermined potential. The exposure unit 32, which is a laser scanning unit (LSU) that includes a laser emitter and a reflection mirror, forms an electrostatic latent image corresponding to the image data on the surface of the photoreceptor drum 36 by exposing the surface of the charged photoreceptor drum 36. The developing device 34 visualizes the electrostatic latent image, which is formed on the surface of the photoreceptor drum 36, by using toners in four colors (Y, M, C, and K). The cleaner unit 38 removes a residual toner remaining on the surface of the photoreceptor drum 36 after the development and the image transfer.

The intermediate transfer belt unit 42 includes an intermediate transfer belt 54, a drive roller 51, a driven roller 53, and four intermediate transfer rollers 55, and is disposed above the photoreceptor drum 36. The intermediate transfer belt 54 is a flexible endless belt that is stretched across multiple rollers such as the drive roller 51 and the driven roller 53, and is disposed such that its surface (outer circumferential surface) comes into contact with the surface of the photoreceptor drum 36. The intermediate transfer belt 54 rotates (rotationally moves) in a predetermined direction with a rotary drive of the drive roller 51. The intermediate transfer rollers 55 are disposed at positions where they face the corresponding photoreceptor drums 36 across the intermediate transfer belt 54. At the time of image formation, the toner images of the respective colors formed on the respective photoreceptor drums 36 are sequentially superimposed and transferred onto the intermediate transfer belt 54 by using the intermediate transfer rollers 55, to form a multicolor toner image on the intermediate transfer belt 54.

The secondary transfer roller 44 is disposed so as to face the drive roller 51 across the intermediate transfer belt 54. When the sheet passes through a secondary transfer nip between the secondary transfer roller 44 and the intermediate transfer belt 54, the toner image formed on the intermediate transfer belt 54 is transferred to the sheet.

The fusing device 46 includes a fusing belt 62 and a pressure roller 64, and is disposed above the secondary transfer roller 44 (on the downstream side in the sheet conveyance direction). A fusing pad 76 and a heat source 82 are disposed on the inner side of the fusing belt 62 (see FIG. 2). The fusing belt 62 is heated to a predetermined fusing temperature (for example, 170° C.) by the heat source 82. The pressure roller 64 presses the fusing belt 62 between the pressure roller 64 and the fusing pad 76. When the sheet passes through a fusing nip N (see FIG. 2) between the pressure roller 64 and the fusing belt 62, the toner image transferred to the sheet is melted, mixed, and pressed, and the toner image thermally fuses to the sheet. The detailed configuration of the fusing device 46 will be described below.

In such an apparatus body 12, a first sheet conveyance path L1 is formed to transport a sheet from the sheet feed tray 43 or the manual sheet feed tray 50 to the output tray 52 through a registration roller 68, the secondary transfer roller 44, and the fusing device 46. A second sheet conveyance path L2 is formed to return the sheet, which has passed through the fusing device 46 after single-sided printing, to an upstream side of the secondary transfer roller 44 in the sheet conveyance direction in the first sheet conveyance path L1 when double-sided printing is performed on the sheet. Multiple conveyance rollers 66 are appropriately provided in the first sheet conveyance path L1 and the second sheet conveyance path L2 to apply an auxiliary propulsion force to the sheet.

The mechanical configuration of the fusing device 46 will now be described with reference to FIG. 2. The fusing device 46 includes a fusing belt 62 as an example of a fusing rotary body and a pressure roller 64 as an example of a pressure rotary body, and fuses the toner image on the sheet by passing the sheet through the fusing nip N formed between the fusing belt 62 and the pressure roller 64.

Figure 2:
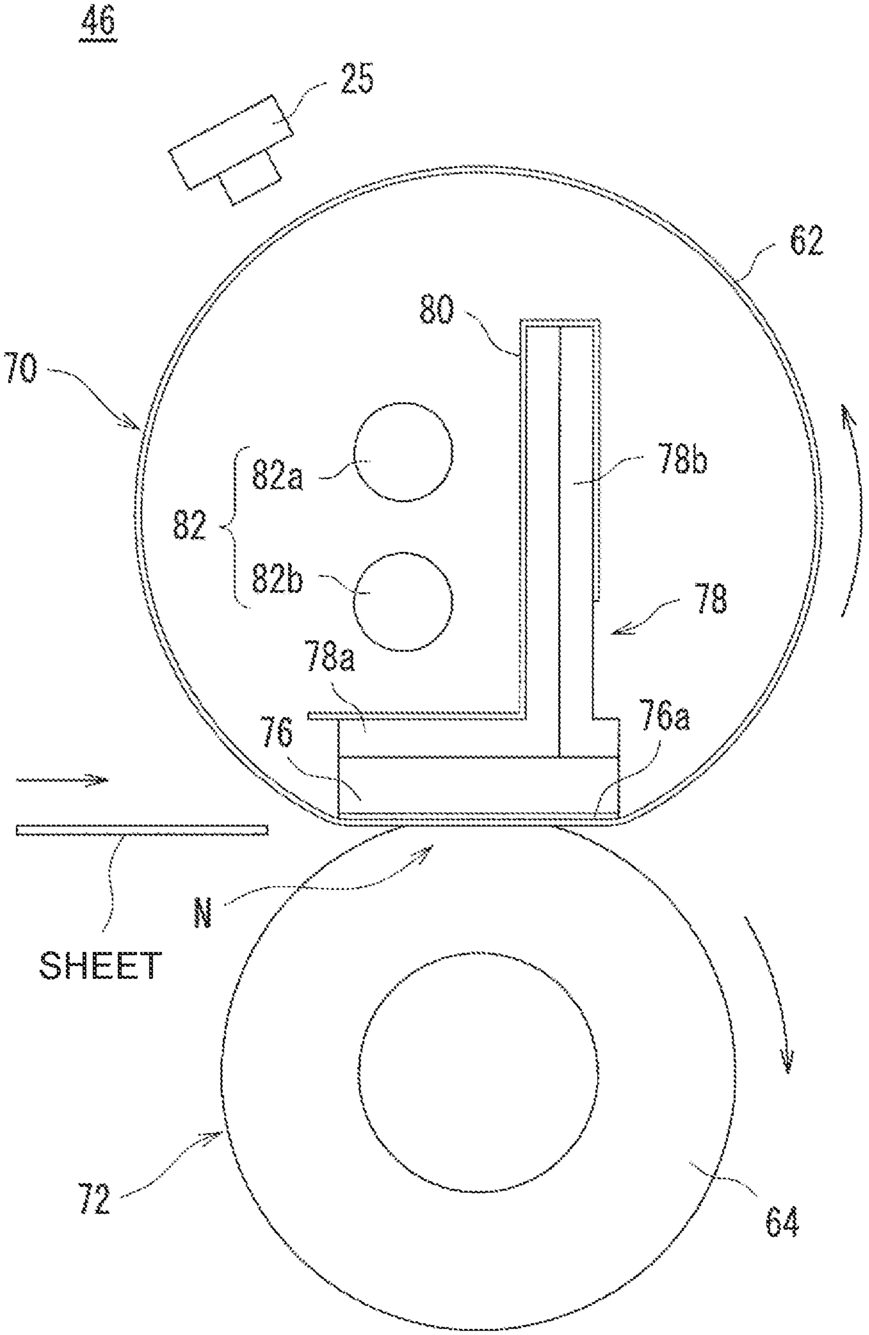
FIG. 2 is a schematic cross-sectional diagram illustrating a fusing device.

Specifically, the fusing device 46 includes a heater unit 70 including the fusing belt 62, and a pressure unit 72 including the pressure roller 64, as illustrated in FIG. 2. The components of the heater unit 70 and the pressure unit 72 are integrally held by a fusing frame (not illustrated) in a predetermined mode.

The heater unit 70 includes the fusing belt 62 formed in a substantially cylindrical shape and extending in the front-back direction (the width direction of the sheet). The fusing belt 62 is, for example, formed by disposing a release layer on the surface of a belt-like base material composed of a synthetic resin, such as polyimide, or a metal, such as nickel. Such a fusing belt 62 is rotatable around its axis, and its inner diameter is, for example, 30 mm. The fusing pad 76, a support member 78, a reflector 80, and the heat source 82 are disposed on the inner side of the fusing belt 62.

The fusing pad 76 is a fixed member fixed in sliding contact with the inner circumferential surface of the fusing belt 62, and is formed in a long plate shape extending along the axial direction of the fusing belt 62. The fusing pad 76 has a sliding contact sheet 76*a* on its outer circumferential surface (at least a sliding contact surface with the fusing belt 62), and sliding oil for reducing the frictional force with the fusing belt 62 is applied to the sliding contact sheet 76*a*. The length of the fusing pad 76 is the same as the length (width) of the fusing belt 62 in the axial direction.

The support member 78 supports the fusing pad 76 while pressing it against the inner circumferential surface of the fusing belt 62, and the two ends of the support member 78 are fixed to the fusing frame. In the first embodiment, the support member 78, which has a substantially L-shaped cross-section, includes a long plate-shaped fixing part 78*a* to which the fusing pad 76 is fixed, and a long plate-shaped erected part 78*b* that is erected from the width direction end of the fixing part 78*a*. The reflector 80 having a plate-like shape is attached to the support member 78 so as to cover the surface adjacent to the heat source 82.

The heat source 82 is a member for heating the fusing belt 62, and extends along the axial direction of the fusing belt 62. The heat source 82 is, for example, a lamp heater such as a halogen lamp. In the present embodiment, the heat source 82 includes a first lamp heater 82*a* that heats a central portion of the fusing belt 62 in the axial direction, and a second lamp heater 82*b* that heats the two ends of the fusing belt 62 in the axial direction. The first lamp heater 82*a* and the second lamp heater 82*b* are used in accordance with the sheet width.

The pressure unit 72 includes the pressure roller 64 that is disposed at a position opposing the fusing pad 76 across the fusing belt 62. The pressure roller 64 is disposed so as to extend parallel to the axial direction of the fusing belt 62, and presses the fusing belt 62 against the fusing pad 76 to form the fusing nip N between the pressure roller 64 and the fusing belt 62.

Figure 3:
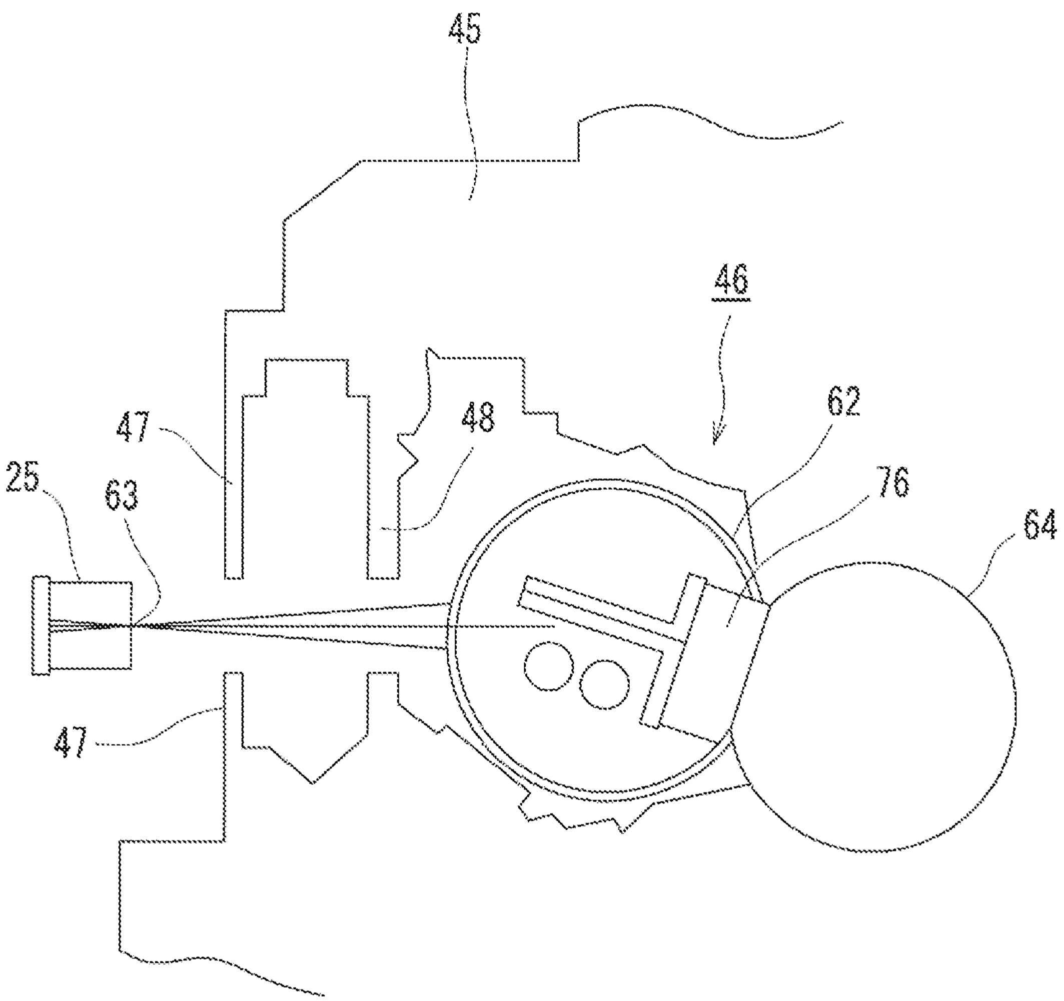
FIG. 3 is a cross-sectional diagram illustrating the positional relationship between a fusing device and a thermopile sensor, which is a temperature measuring device of the fusing device.

The positional relationship between the fusing device 46 and a thermopile sensor 25 according to the present embodiment will now be described. FIG. 3 illustrates the positional relationship between the fusing device 46 and the thermopile sensor 25. Referring to FIG. 3, the fusing device 46 is housed in a fusing device cover 45, and the thermopile sensor 25 is disposed in front of the fusing device cover 45. Specifically, the portion of the fusing belt 62 facing the thermopile sensor 25 is provided with an aperture (opening portion) 63.

The aperture 63 is disposed in a cylindrical member 61 disposed on the front side of the thermopile sensor 25 (see FIG. 5), but the details of the cylindrical member 61 are omitted here.

In front of the aperture 63, a frame 48 and an outer cover 47 of the fusing device cover 45 are disposed in this order, and the dimensions of the opening of the aperture 63 are smaller than those of the opening of the frame 48 and the opening of the outer cover 47. The preferred shape of these openings is a circle, but other shapes are also acceptable.

The diameter of the openings of frame 48 and outer cover 47 is related to the thickness of the light flux, and the thicker one may be designed larger, or the thermopile sensor 25 may be designed with a larger opening in the frame 48 to account for the misalignment of the light flux when the thermopile sensor 25 tilts.

Figure 4:
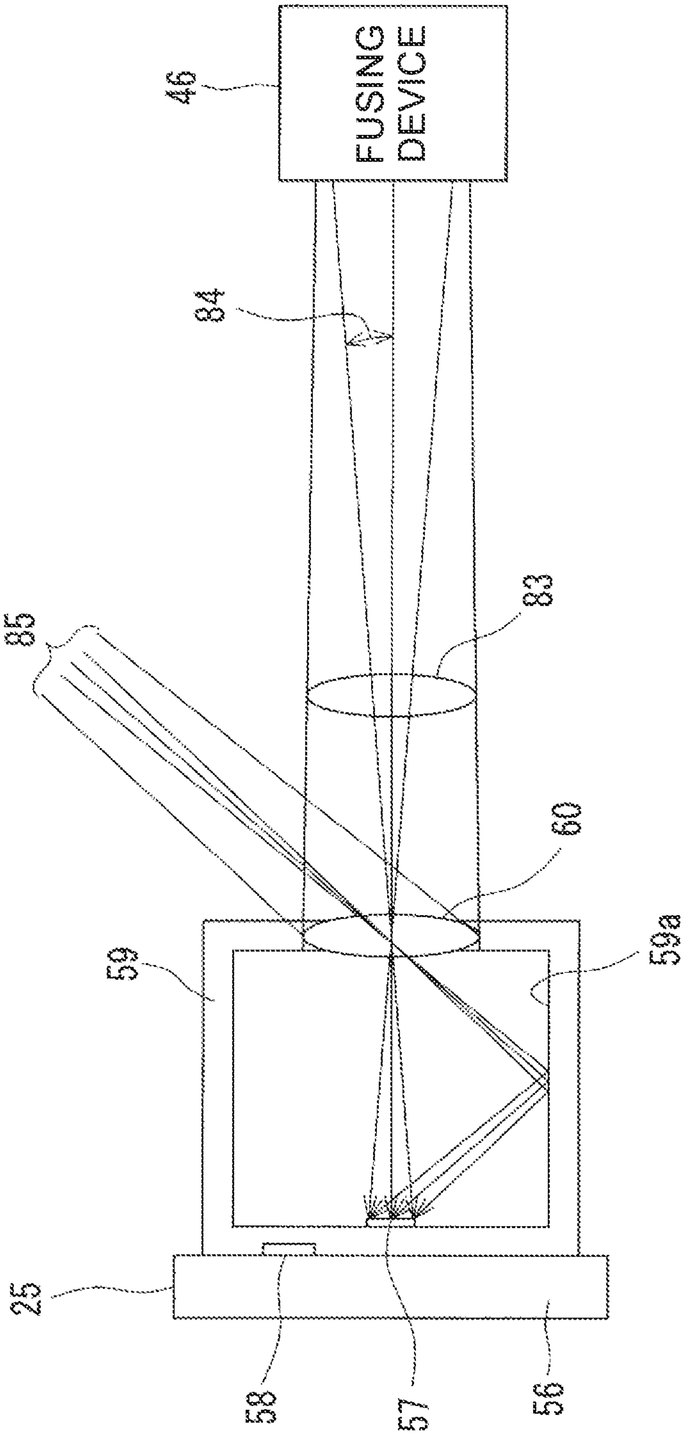
FIG. 4 illustrates the incident path of infrared rays when the temperature of the fusing device is measured with a thermopile sensor.

The infrared light flux incident on the thermopile sensor 25 will now be described. FIG. 4 illustrates the details of the configuration of thermopile sensor 25 and the infrared light flux entering the thermopile sensor 25, and is a cross-sectional view along the optical axis of the infrared light from the fusing device 46. Referring to FIG. 4, the thermopile sensor 25 includes a substrate 56, an ambient temperature measurement element 58 and a CAN 59 disposed on the substrate 56, and a light receiving element 57 disposed on the CAN 59 in the central portion of the substrate 56. The CAN 59 has a cylindrical shape extending toward the fusing device 46, and a lens 60 that collects infrared light is disposed at the central portion at the end of the CAN 59.

In FIG. 4, only light rays passing through the center of the lens 60 are illustrated inside the CAN 59. As illustrated in FIG. 4, the light rays passing through the center of the lens 60 are infrared rays 83 that enter the light receiving element 57 straight from the fusing device 46 through the lens 60, and a light flux 85 that enters the CAN 59 from a diagonally upper direction and is reflected by a wall surface 59*a* in the CAN 59 into the light receiving element 57. The light flux 85 is infrared rays from an object, such as the fusing device cover 45, that cannot be temperature-controlled.

Here, the thermopile sensor 25 measures the temperature of the object by using a measurement principle in which the temperature of the object can be calculated from the infrared energy and the ambient temperature measured by the thermopile sensor 25.

The thermopile sensor 25 increases its sensitivity by condensing the infrared rays from the object with the lens, and the viewing angle 84, which is a reference of the infrared ray receiving range, is designed to be approximately seven degrees.

On the other hand, as mentioned above, there exists an unintended light flux (stray light) 85 that is reflected by the wall surface 59*a* in the CAN 59 of the thermopile sensor 25 and reaches the light receiving element 57. Such infrared rays begin to increase at an angle between 20 to 30 degrees or more relative to the optical axis, and reach a maximum amount at approximately 45 degrees, as illustrated in FIG. 4. In general, approximately 20% of the infrared rays received from an infinitely large uniform plane having a uniform will be unintended infrared rays.

When the temperature of the fusing device 46, such as that illustrated in FIG. 4, is measured, the infrared rays mainly from the outer cover 47 of the fusing device 46 exist as unintended infrared rays. The temperature of the fusing device cover 45 or the like is picked up through receiving such stray light, which is superimposed on the temperature of the fusing belt. This may cause a temperature error.

Figure 5:
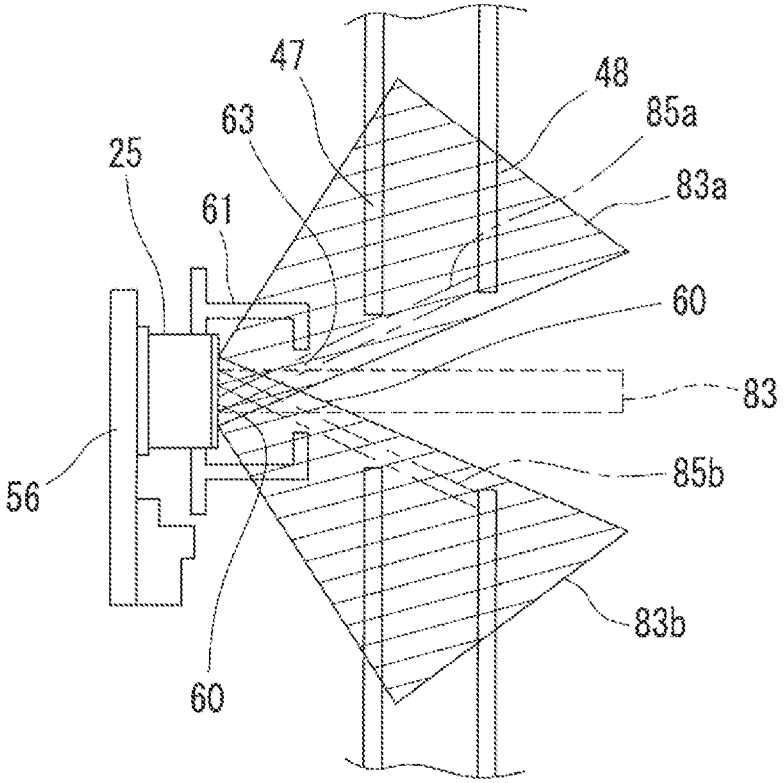
FIG. 5 illustrates the positional relationship between infrared rays from the measurement target that enter the lens of the thermopile sensor, unintended infrared rays (stray light), and a light blocking element.

Thus, in the present embodiment, the following configuration is used to avoid the influence of such stray light. FIG. 5 illustrates such a configuration and the vicinity including the outer cover 47 and the frame 48. In the present embodiment, the cylindrical member 61 is attached to the front surface of the CAN 59 of the thermopile sensor 25.

First Embodiment

With reference to FIG. 5, the thermopile sensor is held by the CAN 59 (that functions as a "sensor holding member"), and the CAN 59 is provided with the cylindrical member 61 extending in front of the thermopile sensor and an aperture 63 disposed at the end of the cylindrical member 61.

By preventing the radiant heat from the outside by the cylindrical member 61 and receiving the stray light radiation from the inner wall of the cylindrical member 61 close to the sensor temperature, the influence on the detected temperature is suppressed, and more stray light can be blocked without disturbing the original light receiving range by the aperture 63 at the end.

In FIG. 5, the infrared rays 83 from the fusing device 46 perpendicularly incident on the lens 60 of the thermopile sensor 25 are indicated by dotted lines, unintended infrared rays (stray light) 83*a* and 83*b* are indicated by diagonal lines, and frame radiation beams 85*a* and 85*b* that are included in the unintended infrared rays (stray light) 83*a* and 83*b* and that are infrared rays from the frame 48 having a temperature higher than that of the opening portion are indicated by dash-dot-dash lines (these correspond to the unintended light flux (stray light) 85 illustrated in FIG. 4).

In the present embodiment, the thermopile sensor 25 is provided with the cylindrical member 61 to receive all the infrared rays 83 from the fusing device 46 (not illustrated), to eliminate the unintended infrared rays (stray light) 83*a* and 83*b* as much as possible, and to receive the frame radiation beams 85*a* and 85*b* by the light receiving element 57 as illustrated in FIG. 4, and the aperture 63 is provided at the end of the cylindrical member 61. Here, the opening diameter of the aperture 63 at the end of the cylindrical member does not interfere with the original light receiving range of the thermopile sensor 25.

That is, although the unintended infrared rays (stray light) 83*a* and 83*b* are blocked by the outer cover 47 and the frame 48, the opening diameter of the aperture 63 is narrowed to further block the stray light from entering the thermopile.

Although it is possible to further narrow the aperture 63 so that only the infrared rays 83 from the fusing device 46 are incident on the aperture 63, the aperture 63 has dimensions that allow the receiving of the frame radiation beams, which are infrared rays from the outer cover 47 having a temperature higher than that of the opening portion. In this way, stray light having temperatures close to that of the thermopile sensor 25 is received, thereby reducing the influence on the measured temperature.

Second Embodiment

The cylindrical member 61 is in contact with the thermopile sensor 25, and the thermopile sensor 25 and the cylindrical member 61 are thermally conductive. This configuration reduces the temperature difference between the cylindrical member 61 and the thermopile sensor 25, thereby reducing stray light radiation.

As for specific opening dimensions, for example, the opening diameter of the aperture 63 is 6 mm, the opening diameter of the outer cover 47 is 12 mm, and the opening diameter of the frame 48 is 16 mm.

Figure 6:
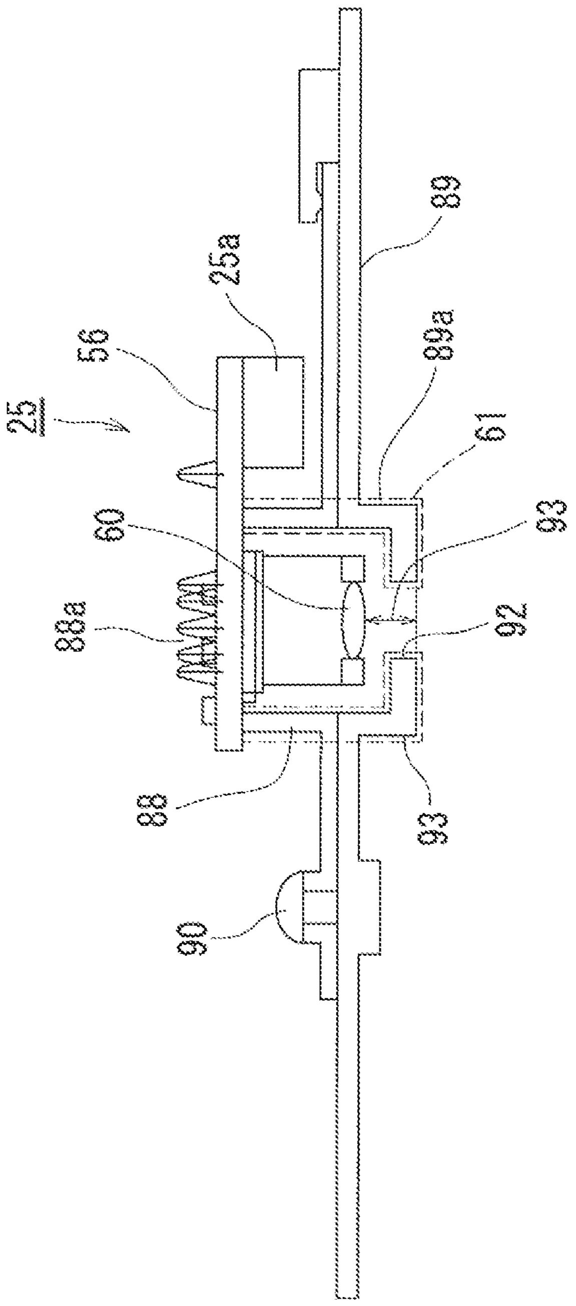
FIG. 6 illustrates the detailed configuration of a thermopile.

The detailed configuration of the cylindrical member 61 of the thermopile sensor 25 will now be described. FIG. 6 illustrates the detailed configuration of the cylindrical member 61 of the thermopile sensor 25. Referring to FIG. 6, the cylindrical member 61 of the thermopile sensor 25 (indicated by the dotted line in the drawing) is formed by combining a thermopile holding part 88 and a duct cover 89 (see FIG. 11) to form a single piece. That is, the cylindrical member 61 includes a thermopile body 25*a* attached to the substrate 56 and the thermopile holding part 88. The thermopile holding part 88 is fixed to the substrate 56 with the thermopile holding hooks 88*a*. The thermopile holding part 88 is fixed to the duct cover 89 with a pin 90, and the duct cover 89 is attached to a duct 91 (see FIG. 11).

As illustrated in FIG. 6, the duct cover 89 has a recess 89*a* facing the lens 60 of the thermopile sensor 25, and an opening portion 92 of the thermopile sensor 25 disposed at the central portion of the recess 89*a*. The opening portion 92 corresponds to the opening of the aperture 63.

Here, the diameter of the opening portion 92 is larger than the diameter of the lens 60, preferably by +1 to 5 mm, and more preferably by +3 mm.

If the diameter of the opening portion 92 is smaller than the diameter of the lens 60 plus+1 mm, the infrared radiation from the object may be blocked. If the diameter of the opening portion 92 is larger than the diameter of the lens 60 by +3 mm, a large amount of stray light from components other than the fusing device, such as a cover, is received, and a temperature error tends to occur.

The distance 93 from the tip of the thermopile to the opening portion will now be described. The distance 93 is preferably with in the range of 2 to 8 mm, more preferably approximately 5 mm. If the distance 93 is less than 2 mm, the effect of the aperture is weakened, and more stray light from the outer cover 47 or other sources is received, which can readily cause a temperature error. If the distance 93 is more than 8 mm, the cylindrical member 61 will be disposed close to the fusing device and is easily heated by radiant heat. This results in a temperature difference between the cylindrical member 61 and the thermopile sensor, which causes an increase in the amount of infrared radiation from the opening portion, which tends to cause a temperature error.

The following is a summary of the above. That is, the material of the opening portion 92 (duct cover) is selected from resins, such as polycarbonate (PC), polyethylene terephthalate (PET), or glass-fiber-filled versions of these resins.

When the diameter of the lens 60 of the thermopile sensor is 4 mm, the diameter of the opening portion 92 of the thermopile sensor is 7 mm, and the distance 93 is 5 mm.

When the diameter of the lens 60 of the thermopile sensor is 6 mm, the diameter of the opening portion 92 of the thermopile sensor is 9 mm, and the distance 93 is 5 mm.

Figure 7A:
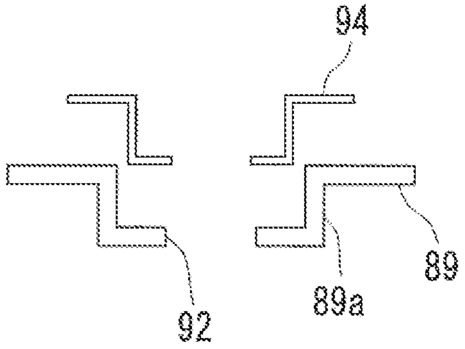
FIG. 7A illustrates the inner side of a duct cover of a cylindrical member.
Figure 7B:
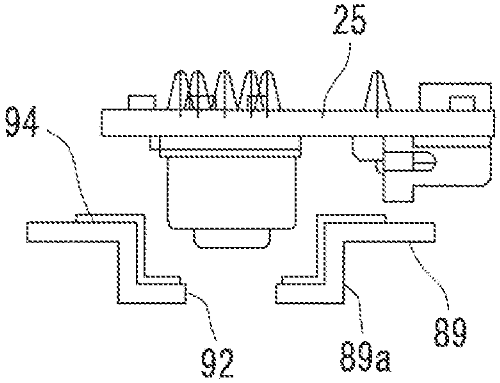
FIG. 7B illustrates the inner side of the duct cover of the cylindrical member.
Figure 8A:
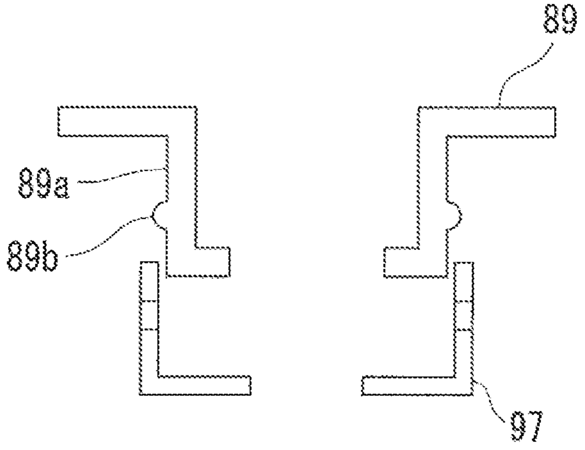
FIG. 8A illustrates the outer side of the duct cover of the cylindrical member.
Figure 8B:
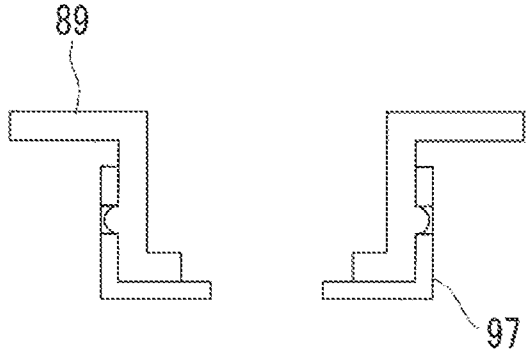
FIG. 8B illustrates the outer side of the duct cover of the cylindrical member.
Figure 8C:
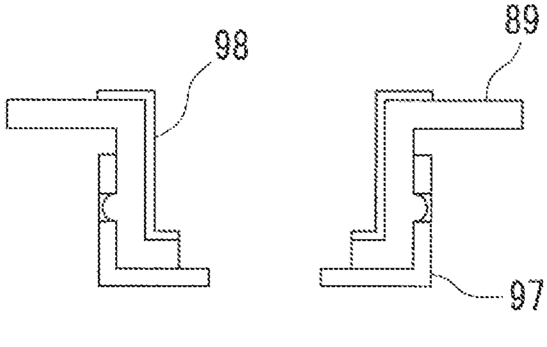
FIG. 8C illustrates the outer side of the duct cover of the cylindrical member.

The material of the opening portion 92 will now be described. FIGS. 7A, 7B, and 8A to 8C illustrate a specific configuration of the opening portion 92. FIGS. 7A and 7B illustrate the details a case in which a metal cylinder 94 is disposed on the inner side of the opening portion 92. FIGS. 8A to 8C illustrates a case in which a metal cap 97 is disposed on the outer side of the opening portion 92.

Referring to FIG. 7A, the metal cylinder 94 is fit into the recess 89*a* in the duct cover 89 of the thermopile sensor 25, and then the duct cover 89 and the metal cylinder 94 are fit into the front of the thermopile holding part 88 housing the CAN 59 of the thermopile sensor 25 (FIG. 7B).

Here, the metal cylinder 94, which serves as the inner wall of the cylindrical member 61, is composed of a metal having low emissivity. The use of a metal having low emissivity reduces radiation and stray light radiation.

As for emissivity, the emissivity of the PC that constitutes the duct cover 89 is 0.9, and the emissivity of the Ni-coated steel plate that constitutes the metal cylinder 94 is 0.2 or less. The emissivity of aluminum is 0.1 or less, and that of stainless steel is within the range of 0.3 to 0.6.

In order to reduce a temperature error, it is necessary to reduce the amount of infrared radiation from the opening portion. Thus, the temperature difference between the opening portion and the thermopile sensor can be reduced, and a material having low infrared radiation can be used for the inner wall of the opening portion, to further reduce the amount of infrared radiation.

As mentioned above, the emissivity of resin is approximately 0.9, while metallic materials, such as Ni-coated steel sheet (0.2 or less), and aluminum (0.1 or less) can reduce the amount of infrared radiation to 20% or less. The emissivity of stainless steel is higher than that of the above-mentioned metals, and the effect is smaller than that of the above-mentioned metals.

Therefore, Ni-coated steel sheets, aluminum, and the like are preferred on the basis of their emissivity, cost, and workability.

Referring to FIG. 8, a projection 89*b* is disposed on the outer side of the recess 89*a* of the duct cover 89 (FIG. 8A), and the metal cap 97 having a recess (or opening) that engages the projection 89*b* is fit over the projection 89*b* (FIG. 8B). Such a configuration suppresses the temperature rise of the holding portion due to radiation from the fusing device and reduces the temperature difference between the holding portion and the thermopile sensor.

This is combined with the sheet metal 98 on the inner side and placed in front of the thermopile sensor 25 (FIG. 80). The projection and the recess used for this engagement can be provided on any one of the members.

If the temperature rise of the opening portion is not small, such as when the opening portion is close to the fusing belt, and the temperature difference between the opening portion and the thermopile sensor is not small, the temperature rise of the opening portion can be suppressed by providing the metal cap on the outer side of the opening portion.

Metal materials that have high reflectivity and are less susceptible to radiant heat are preferable. Ni-coated steel sheets, aluminum, and the like are preferable on the basis of their cost and workability.

Figure 9:
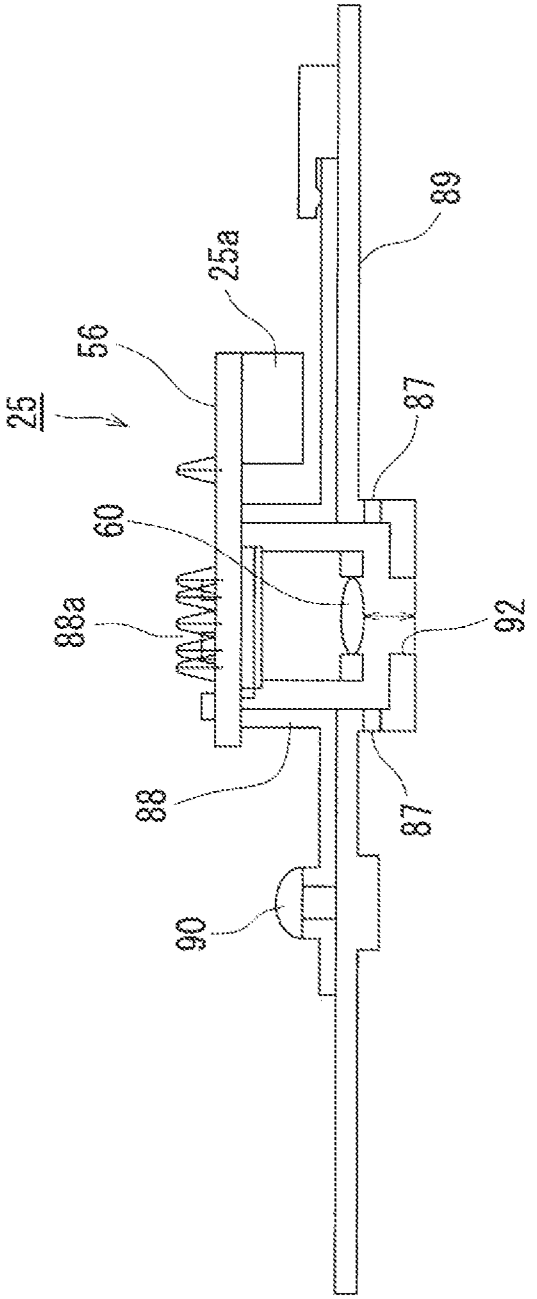
FIG. 9 illustrates a ventilation port in an opening portion of the cylindrical member.

The ventilation ports of the opening portion 92 will now be described. FIG. 9 is similar to FIG. 6 and illustrates ventilation ports 87 in the opening portion 92. As the temperature of the opening portion 92 is made equal to that of the thermopile sensor 25, the stray light receiving energy is reduced, and the measurement error is reduced. Thus, ventilation ports 87 are provided in the recess 89*a* of the duct cover 89 constituting the cylindrical member to the suppress temperature rise of the thermopile holding part 88. FIG. 9 illustrates the recess 89*a* of duct cover 89 in the configuration illustrated in FIG. 6, but the configuration may be that illustrated in FIGS. 7A to 8C.

The temperature of the opening portion 92 rises by the radiant heat from the fusing belt 62 and by the hot air, especially the temperature of the air inside the opening portion 92 rises. Thus, the ventilation ports 87 are provided in the side walls of the opening portion 92 to allow warm air to escape, and thereby reduce the temperature inside the opening portion 92.

The ventilation ports 87 may be provided on the left and right, as illustrated in the drawing, or up and down (front and back in the drawing). To prevent stray light from being received from outside the opening portion 92, the holes should have a diameter smaller than the thickness of the opening portion.

The effects of the configuration will now be explained.

The temperatures detected five minutes and one hour after the start of the sheet passing are listed below for each of the following conditions, where the temperature control setting of the fusing belt 62 is 150° C., the ambient temperature is 25° C., and the temperature detected by the thermopile sensor at the time when the fusing belt temperature reaches 150° C. immediately after the power supply is turned on is set to 150° C.

A metal cap composed of a nickel-plated steel sheet having a thickness of 0.2 mm was used.

TABLE 1

| | Initial temperature | Temperature after 5 minutes | Temperature after 1 hour |
|---|---|---|---|
| Without opening portion (comparative example) | 150 | 152.9 | 155.3 |
| With opening portion (the disclosure) | 150 | 151.3 | 152.6 |
| Metal cap on inner side of opening portion (the disclosure) | 150 | 150.6 | 151.2 |
| Metal cap on outer side of opening portion (the disclosure) | 150 | 150.6 | 151.0 |

Without the opening portion, the temperature deviation after one hour was as large as 5.3° C., whereas the deviation was kept to 2.6° C. with the opening portion according to the disclosure, 1.2° C. with the metal inside the opening portion, and 1.0° C. with the metal outside the opening portion.

For reference, the temperatures (° C.) of the components around the thermopile sensor are listed in Table 2.

TABLE 2

| | Temperature at power ON | Initial temperature | Temperature after 5 minutes | Temperature after 1 hour |
|---|---|---|---|---|
| Fusing belt | 25 | 150 | 150 | 150 |
| Metal frame of fusing device | 25 | 30 | 48 | 74 |

TABLE 2-continued

| | Temperature at power ON | Initial temperature | Temperature after 5 minutes | Temperature after 1 hour |
|---|---|---|---|---|
| Resin cover of fusing device | 25 | 25 | 38 | 62 |
| Duct cover | 25 | 25 | 30 | 48 |
| Thermopile sensor temperature | 25 | 25 | 26 | 40 |

Figure 10:
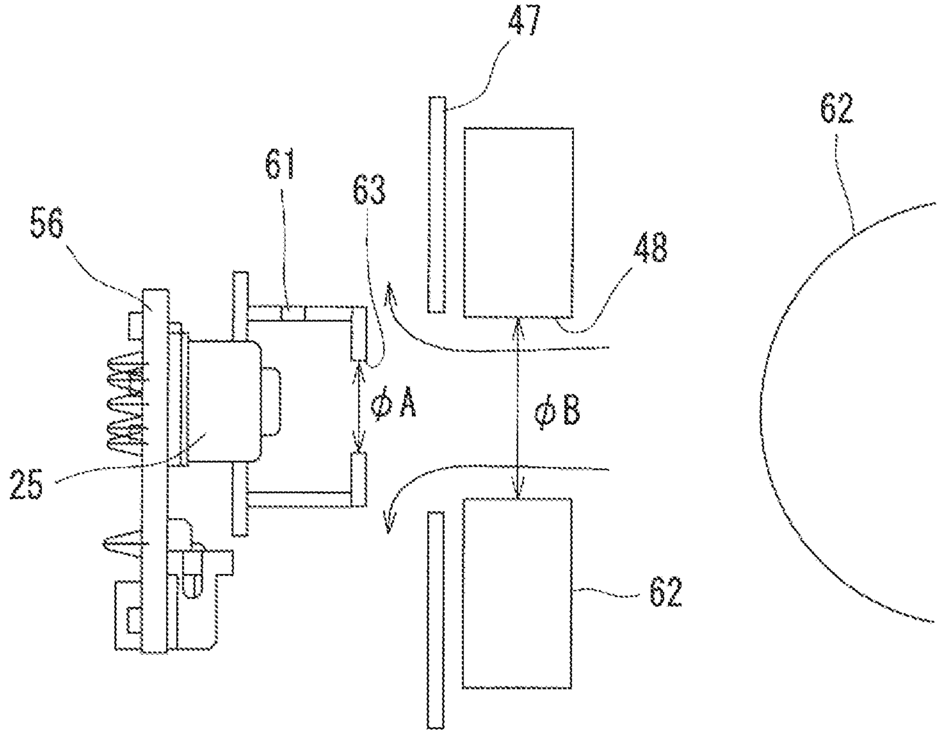
FIG. 10 illustrates the portion where the opening portion of the cylindrical member opposes an opening of an outer cover of the fusing device.
Figure 11:
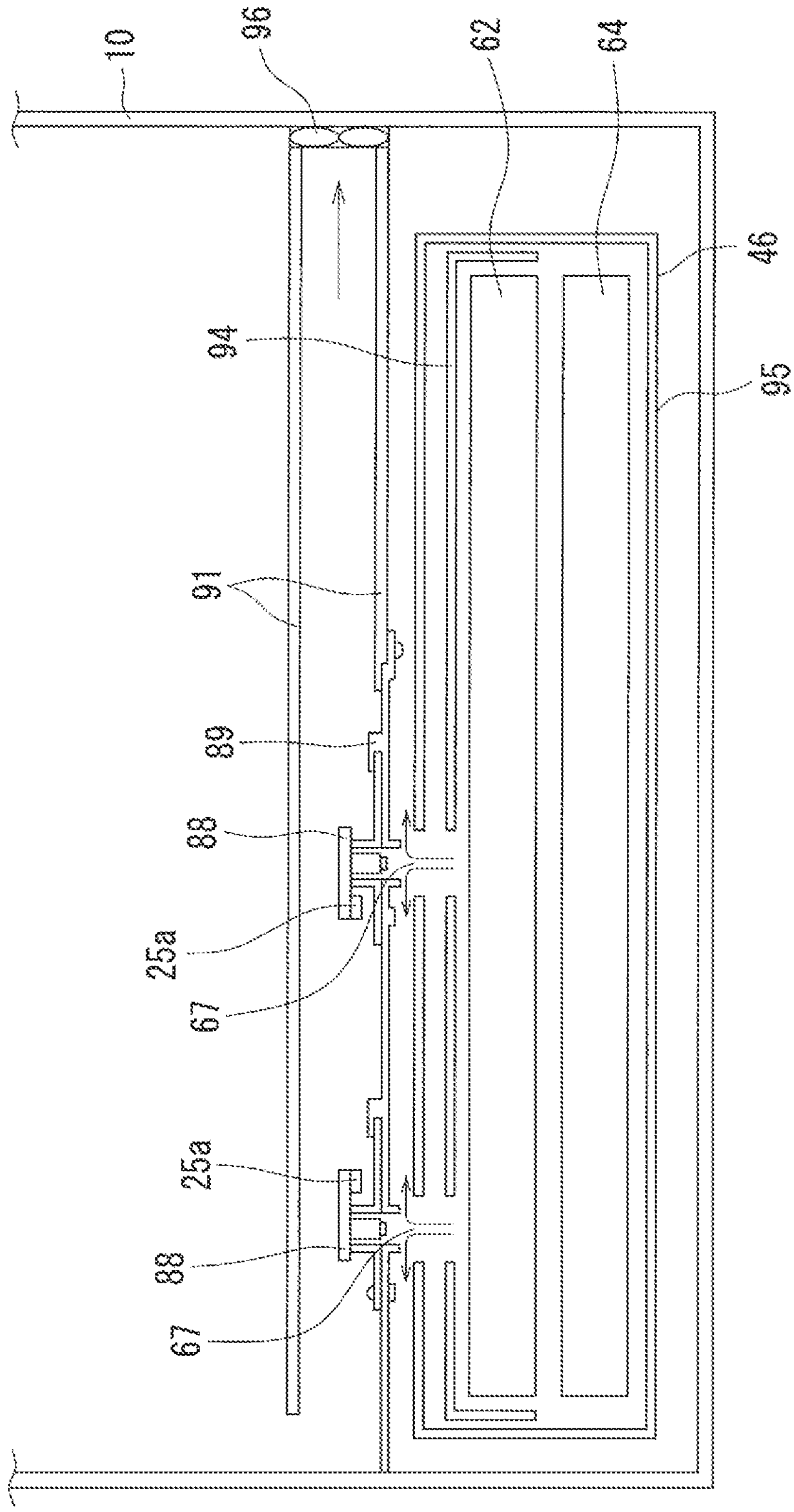
FIG. 11 is a cross-sectional view of the area near the thermopile sensor when the image forming apparatus is viewed from above.

A method of reducing the influence of the airflow during the temperature measurement by the thermopile sensor 25 according to the present embodiment will now be explained. FIG. 10 illustrates the airflow in the vicinity of the thermopile sensor 25 in the present embodiment. FIG. 11 is a cross-sectional view of the fusing device 46 when viewed from the top of the image forming apparatus 10 in which a plurality of thermopile sensors 25 illustrated in FIG. 10 are installed consecutively (arrayed). In the drawing, the left side is the front side of the image forming apparatus, and the right side is the rear side of the image forming apparatus.

Referring to FIG. 10, the opening of the aperture 63 at the end of the cylindrical member 61 of the thermopile sensor 25 faces the opening portions of the outer cover 47 and the frame 48 of the fusing device, and the diameter φA of the opening of the aperture 63 is smaller than the diameter φB of the opening portion of the frame 48, wherein, for example, φA is approximately 6.5 mm, and φB is approximately 12 mm. Here, the shapes of the outer cover 47 and frame 48 are different from those in FIG. 5.

Airflow between the outer cover 47 and the frame 48 causes condensation on the thermopile sensor 25. Therefore, in the present embodiment, φB is larger than φA, and a gap is formed between the opening portions of the outer cover 47 and the frame 48, thereby making it difficult for the airflow (indicated by an arrow in the drawing) from the fusing device 46 to enter the aperture of the thermopile sensor 25.

As illustrated in FIG. 10, the CAN portion of the thermopile sensor (the portion provided with the lens 60) has no portion communicating with the outside air other than the front opening portion (there is no duct member as described in the conventional technique). The thermopile CAN is exposed to the outside air only at the front opening portions. That is, there is no airflow from the thermopile substrate 56 side to the fusing belt 62 as in the conventional technique.

As a result, there is no blowout from the thermopile sensor 25 side, and the fusing belt 62 is not cooled.

The configuration for generating airflow from the fusing device 46 to the thermopile sensor 25 will now be described. Referring to FIG. 11, to generate airflow (indicated by an arrow in the drawing) that does not enter into the cylindrical member 61 of the thermopile sensor 25 from the opening portion of the fusing device 46, an exhaust fan 96 for discharging the airflow to the outside is provided through the duct 91. The exhaust fan 96 is provided to control the temperature rise inside the image forming apparatus.

When there is a gap in the thermopile, airflow 67 from inside the fusing device is drawn by the exhaust fan 96 toward the thermopile. This causes condensation on the thermopile and a temperature rise in the CAN.

By ensuring that there are no gaps in the thermopile, the above-described problem can be prevented.

The disclosure can be implemented in various other forms without departing from the spirit or principal features of the invention. Therefore, the embodiments as described above are mere examples and should not be interpreted restrictively. All modifications and variations that come within the equivalent scope of the claims are within the scope of the disclosure.

INDUSTRIAL APPLICABILITY

The disclosure is useful when applied to a temperature measuring device of a fusing device because, by receiving stray light radiation from a cylindrical inner wall near the sensor temperature, the influence on the detection temperature is suppressed, more stray light can be blocked without interfering with the original light receiving range by an aperture at the end, and erroneous detection by a thermopile sensor can be prevented.

What is claimed is:

1. An image forming apparatus comprising:

a fusing device housed in a fusing device cover having an opening portion; and a temperature measuring device including a thermopile sensor that measures a temperature of the fusing device through the opening portion, the thermopile sensor being disposed outside the fusing device, wherein the thermopile sensor is held by a sensor holding member, the sensor holding member includes a cylindrical member extending in front of the thermopile sensor and an aperture disposed at an end of the cylindrical member, and an opening of the aperture is smaller than the opening portion, and is located on straight lines joining an outer edge of the opening portion and the thermopile sensor.

2. The image forming apparatus according to claim 1, wherein the cylindrical member is in contact with the thermopile sensor, and the thermopile sensor and the cylindrical member are thermally conductive.

3. The image forming apparatus according to claim 1, wherein an opening diameter of the aperture at the end of the cylindrical member does not interfere with an original light receiving range of the thermopile sensor.

4. The image forming apparatus according to claim 1, wherein a metal cylinder comprising a Ni-coated steel sheet or aluminum is disposed on an inner wall of the cylindrical member.

5. The image forming apparatus according to claim 1, wherein a metal cap comprising a Ni-coated steel sheet or aluminum is disposed on the end of the cylindrical member.

6. The image forming apparatus according to claim 1, wherein a ventilation port is disposed on the cylindrical member.

7. The image forming apparatus according to claim 1, further comprising:

an exhaust fan that discharges airflow to outside to generate airflow that does not enter the cylindrical member through the opening portion disposed in the fusing device, wherein a gap is provided between the opening portion disposed in the fusing device and the aperture.

* * * * *